No. 714,510. Patented Nov. 25, 1902.
R. G. NASH.
PROCESS OF AERATING AND PRESERVING MILK.
(Application filed Dec. 28, 1897.)
(No Model.)
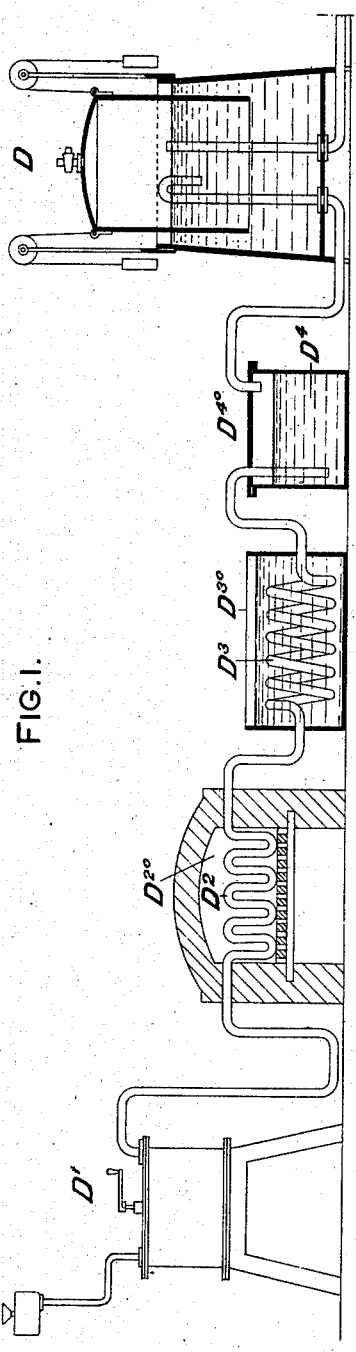
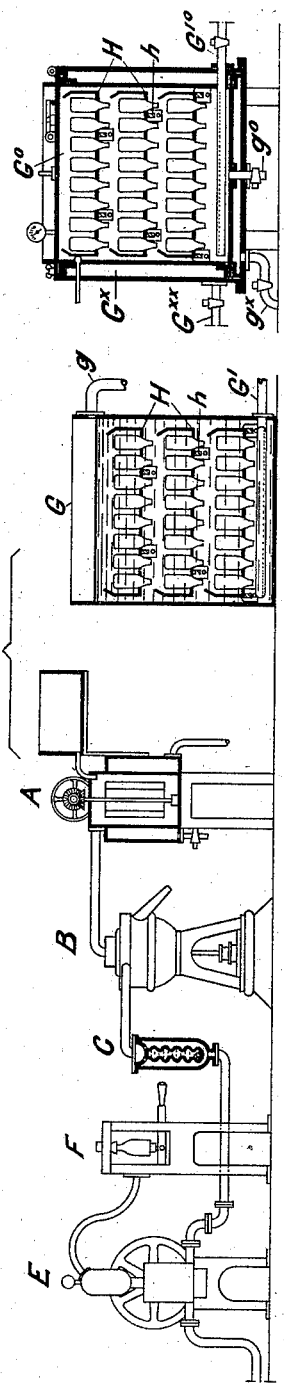
Witnesses.
Thos. P. Elam.
E. R. Wood.
Inventor.
Richard Grainger Nash.
per G. J. M. Hardingham
Attorney

UNITED STATES PATENT OFFICE.

RICHARD GRAINGER NASH, OF LUCAN, NEAR DUBLIN, IRELAND.

PROCESS OF AERATING AND PRESERVING MILK.

SPECIFICATION forming part of Letters Patent No. 714,510, dated November 25, 1902.

Application filed December 28, 1897. Serial No. 663,880. (No specimens.)

*To all whom it may concern:*

Be it known that I, RICHARD GRAINGER NASH, a subject of Her Majesty the Queen of Great Britain and Ireland, residing at Finnstown House, Lucan, near Dublin, Ireland, have invented certain new and useful Improvements in the Aeration and Preservation of Milk, (for which I have obtained Letters Patent in Belgium, No. 130,850, dated September 25, 1897, and for which I have applied for Letters Patent in Great Britain, No. 14,209, to bear date June 26, 1896,) of which the following is a specification.

This invention relates to an improved process of aerating and preserving milk; and it consists in separately sterilizing the carbonic-acid gas, oxygen, atmospheric air, or other gas employed in aerating and the milk prior to their commixtion, the bottled or decanted mixture being, moreover, subjected to treatment with a view to its complete sterilization.

In the accompanying drawings, Figure 1 illustrates a diagrammatical view of a series of appliances adapted for treating milk according to my improved method. Fig. 2 is a section of an alternative form of apparatus for employment in finally heating and completing sterilization of the bottled or decanted mixture.

A is a heater; B, a separator; C, a cooler. D is a receiver for gas or air.

E is an aerating-machine, and F a bottling-machine.

G is the apparatus employed for completing the sterilization of the bottled mixture.

According to my improved method the milk, (which may be "new" milk, "skimmed" or separated milk or whey, but preferably separated milk,) to which water or other liquid may be added, is first partly sterilized by heating it in a receptacle A to a temperature of 156° to 160° Fahrenheit. The milk may then be again subjected to the action of a cream-separator B and then cooled by means of the cooler C, same consisting of a coil immersed in ice or cold water or other suitable cooling appliance, the temperature of the milk being hereby reduced to about 40° Fahrenheit.

The aerating-gas may be carbonic acid, oxygen, air, or other suitable medium. When carbonic acid is used as the aerating medium, the gas having been produced by any known method, as at $D'$, is sterilized in the following manner: On leaving the generator $D'$ it is first caused to pass through a coil $D^2$, containing any suitable purifying agent and which is maintained at a red heat in a closed chamber $D^{2o}$. This coil $D^2$ may, however, be heated by means of steam or by being immersed in boiling water. The gas is then cooled by causing the same to pass through a coil $D^3$, submerged in cold water in a tank $D^{3o}$. Any bacteria contained in the gas being thus destroyed and any bad flavor or other objectionable qualities it may have possessed having been removed the gas is then washed by passing it through a bath $D^{4o}$, containing sterilized water or other suitable purifying liquid or substance $D^4$, the quality of the gas being hereby further improved. The gas thus sterilized and washed is then charged, by means of a suitable aerating-machine or pump E, into the milk, and the mixture is decanted or bottled with the aid of a bottling-machine F.

By treating the milk in the manner above described a large portion of the bacteria is destroyed, the curdling of the milk upon its coming into contact with the gas is prevented, and any objectionable flavor the milk may have possessed or acquired is removed. By adding soda, potash, or other suitable substance and sugar in the proper proportions—for example, about one and one-half drams of potash and three drams of sugar to each gallon of milk—I find curdling of the mixture is prevented, and if sterilized water in the proportion of about one quart of water to each gallon of milk be added the flavor of the mixture is improved and rendered similar to the ordinary soda and milk mixture.

If it be desired to impart a flavor to the milk, the flavoring matter, which may be in any convenient form, such as an essence, is preferably added to the sterilized water $D^4$ in the bath or tank $D^{4o}$, to be taken up by the gas in its passage therethrough prior to the gas being forced into the milk. In place of or in addition to the flavoring matter an alkali, such as bicarbonate of soda, may be added, the alkali acting as a corrective of any acid tendency in the milk. Instead of flavoring the gas on its passage through the sterilized water the aerating-gas may be passed through or over the flavoring-essence. The flavoring matter or essence may in some instances be added to the milk; but I have found that when adding some flavoring matters to the milk instead of to the gas the tendency has been to curdle the milk. Under certain circumstances this mode of procedure is therefore unadvisable. If desired, a suitable quantity of sugar may be added to the milk.

In order to produce a creamy "head" on the aerated milk, and thus to improve its appearance when served for consumption, a suitable essence, such as commonly employed in the manufacture of aerated waters, may be added. If not already flavored as previously described, a little ginger or other flavoring-essence may be added to the milk before bottling.

The charged bottles containing the sterilized and aerated mixture are placed in a bath G, containing water, which is raised by suitable means to a temperature of about 160° Fahrenheit for about thirty minutes and cooled as quickly as possible for the purpose of completing the process of sterilization. The heating of the bath may be effected by passing steam or hot water therein by means of the pipe $G'$, the cooling being accomplished by shutting off the flow of steam or hot water and admitting cold water into the bath by means of the same pipe, the latter being provided with a two-way cock for use in effecting the desired object. The bottles are contained on trays H, furnished with handles for facilitating their insertion in and removal from the vessel and are supported by transverse bars $h$ or brackets. $g$ is an overflow-pipe.

The completion of the sterilization of the mixture may, however, be carried out in a jacketed vessel $G^\circ$, to which steam is admitted by way of the pipe $G'^\circ$, and wherein the temperature is raised, say, to 150° or 212° Fahrenheit or thereabout, the charged bottles being maintained at this temperature for one hour or thereabout. The steam is then shut off and the contents of the vessel cooled by supplying cold water to the jacket $G^\times$ by means of the pipe $G^{\times\times}$.

$g^\circ$ $g^\times$ are drain-pipes for the interior of the vessel and the jacket, respectively.

The temperatures and duration of heating at any of the stages may be varied to suit requirements, as also the pressure at which the bottling is effected. In hot weather, or if the mixture be required for consumption in hot climates, the water in the bath may be raised to a temperature of about 212° Fahrenheit for about twenty minutes, the temperature being then lowered to 90° Fahrenheit or thereabout. After an interval the temperature is again raised to about 212° Fahrenheit for about twenty minutes and then lowered as quickly as possible.

If the mixture be required for keeping a considerable time, I find it advantageous to reheat it after an interval of about twenty-four hours or forty-eight hours from the first heating, the temperature of the vessel or bath being again raised to 212° Fahrenheit and then reduced as rapidly as possible. Any fresh germs which may have developed in the interval between the first and second heating are hereby destroyed. This process of reheating may be repeated as often as circumstances may require. In certain states of the weather a lower temperature than 212° Fahrenheit will suffice, and the periods during which the heat is maintained may also be varied.

Before commencing operation the apparatus, bottles, and other receptacles should be sterilized.

What I claim as my invention, and desire to secure by Letters Patent, is—

1. The improved process of aerating and preserving milk, substantially as herein described, consisting in partially sterilizing skimmed or separated milk by heating it to a temperature of 150° to 160° Fahrenheit cooling the same to about 40° Fahrenheit by means of a coil immersed in ice; sterilizing the aerating-gas by causing the same to pass through a heated coil in a closed chamber, then through a coil submerged in cold water, then passing the gas through a bath of sterilized water containing a flavoring-essence; charging the partially-sterilized milk with the sterilized gas, bottling the aerated mixture, subjecting the bottled mixture in a closed vessel for about one hour to a temperature of 150° to 212° Fahrenheit and then rapidly cooling the same; a sterilized aerated beverage being thus obtained.

2. In the process of aerating and preserving milk, passing the aerating-gas through a heated coil in a closed chamber, then through a coil submerged in cold water, then through a bath of sterilized water, substantially as set forth.

3. In the process of aerating and preserving milk, sterilizing and flavoring the aerating-gas and partially sterilizing the milk, then charging the latter with the sterilized gas, substantially as set forth.

RICHARD GRAINGER NASH.

Witnesses:
A. DONN PIATT,
NEWTON B. ASHBY.